(12) United States Patent
Park et al.

(10) Patent No.: US 10,229,649 B2
(45) Date of Patent: Mar. 12, 2019

(54) USER TERMINAL APPARATUS AND CONTROLLING METHOD THEREOF

(71) Applicant: SAMSUNG ELECTRONICS CO., LTD., Suwon-si (KR)

(72) Inventors: Sang-young Park, Suwon-si (KR); Kil-soo Jung, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/573,246

(22) Filed: Dec. 17, 2014

(65) Prior Publication Data

US 2015/0355729 A1  Dec. 10, 2015

(30) Foreign Application Priority Data

Jun. 10, 2014 (KR) ........................ 10-2014-0069791

(51) Int. Cl.
| | |
|---|---|
| G09G 5/00 | (2006.01) |
| G06F 3/14 | (2006.01) |
| G06F 1/16 | (2006.01) |
| G06F 3/0488 | (2013.01) |

(52) U.S. Cl.
CPC .......... G09G 5/003 (2013.01); G06F 1/1624 (2013.01); G06F 1/1643 (2013.01); G06F 1/1647 (2013.01); G06F 1/1686 (2013.01); G06F 3/04886 (2013.01); G06F 3/1446 (2013.01); *G09G 2300/0426* (2013.01)

(58) Field of Classification Search
CPC ..... G06F 2200/1614; G06F 2200/1637; G06F 2200/1635; G06F 2200/1634; G06F 2200/1631; G06F 2203/04803; G09G 2300/023; G09G 2300/026
See application file for complete search history.

(56) References Cited

U.S. PATENT DOCUMENTS

| | | | |
|---|---|---|---|
| 8,629,848 B2 | 1/2014 | Tani et al. | |
| 2010/0328223 A1 | 12/2010 | Mockarram-Dorri et al. | |
| 2013/0010003 A1* | 1/2013 | Yamano | G09G 3/32 345/690 |
| 2013/0155590 A1* | 6/2013 | Tani | H04M 1/0237 361/679.01 |
| 2013/0196718 A1* | 8/2013 | Tani | G01C 21/20 455/566 |

(Continued)

FOREIGN PATENT DOCUMENTS

| | | |
|---|---|---|
| JP | 2011-248208 A | 12/2011 |
| JP | 2011-248691 A | 12/2011 |

(Continued)

*Primary Examiner* — William Boddie
*Assistant Examiner* — Jeffrey A Parker
(74) *Attorney, Agent, or Firm* — Sughrue Mion, PLLC

(57) ABSTRACT

A user terminal apparatus is provided. The apparatus includes a first body, a second body mounted on one side of the first body to be slidably connected to the first body, a transparent display formed on the second body, and a controller configured to provide different user functions to a first area in the transparent display, which overlaps with the first body, and a second area which is a remaining part of the transparent display in response to the second body being slid from the first body to open the first body.

11 Claims, 23 Drawing Sheets

(56) References Cited

U.S. PATENT DOCUMENTS

2014/0035942 A1* 2/2014 Yun .................. G09G 5/006
                                                    345/592
2014/0098095 A1* 4/2014 Lee .................. G06F 3/041
                                                    345/420

FOREIGN PATENT DOCUMENTS

KR     10-2012-0003423 A    1/2012
KR         10-1351732 B1    1/2014

\* cited by examiner

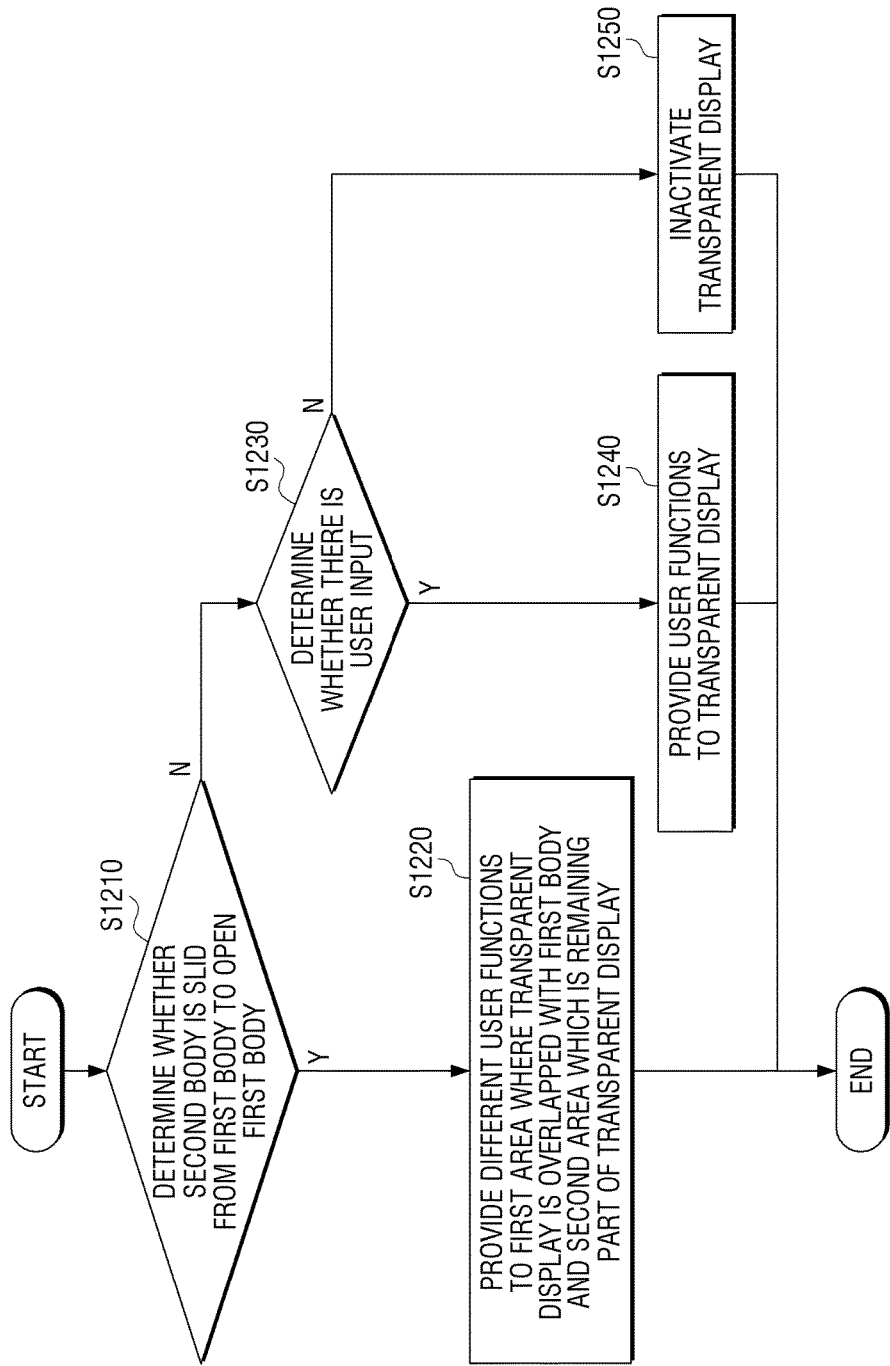

USER TERMINAL APPARATUS AND CONTROLLING METHOD THEREOF

CROSS-REFERENCE TO THE RELATED APPLICATION

This application claims priority from Korean Patent Application No. 10-2014-0069791, filed in the Korean Intellectual Property Office on Jun. 10, 2014, the entire disclosure of which is incorporated herein its entirety by reference.

BACKGROUND

1. Field

Apparatuses and methods consistent with exemplary embodiments relate to a user terminal apparatus including a transparent display and a controlling method thereof.

2. Description of the Related Art

With the development of electronic technology, various types of user terminal apparatuses are developed in various areas. In particular, a discussion for research and development of a next-generation user terminal apparatus including a transparent display has been accelerated these days.

A transparent display refers to an apparatus made of transparent materials, allowing a user to see a background image of the apparatus. In a related art, opaque semiconductor compounds such as Si and GaAs have been used to manufacture a display panel. With increasing demands for various display services which cannot be realized with the existing display panel, there has been an effort to develop new types of electronic element which satisfy such demands, and one of those types of element is a transparent display.

A transparent display has transparent properties as it is configured to include a transparent oxide semiconductor layer. With the transparent display, a user may see necessary information displayed on the transparent display while seeing a background image of the display apparatus, thereby overcoming spatial and temporal restrictions of the existing display apparatuses.

As a transparent display displays various pieces of information through a display unit having transparent properties, actual objects in the background of the apparatus and information on the display can be shown in a harmonious manner.

However, due to the transparent properties of a transparent display, visibility of the display apparatus may be worse than that of a general display apparatus. Accordingly, a technology addressing this problem, and thus, allowing a user to engage in various activities is required.

SUMMARY

Various exemplary embodiments provide a user terminal apparatus capable of providing user functions using a transparent display and a controlling method thereof.

According to an aspect of an exemplary embodiment, there is provided a user terminal apparatus which may include: a first body, a second body mounted on one side of the first body to be slidably connected to the first body; a transparent display formed on the second body; and a controller configured to provide different user functions to a first area in the transparent display, which overlaps with the first body, and a second area which is a remaining part of the transparent display in response to the second body being slid from the first body to open the first body.

The controller may be configured to provide different user functions to a first area in the transparent display, which overlaps with the first body, and a second area which is a remaining part of the transparent display.

The display may be one of a light-emitting display, a reflective display and a transparent display.

The transparent display may include a touch panel for detecting a user touch, and the controller may display at least one control menu on the first area, activate the touch panel in the first area, and inactivate the touch panel in the second area.

The transparent may include a touch panel for detecting a user touch, and the controller may display a control menu on the third area for controlling the first area and the second area, and inactivate the touch panel.

The first body may include a panel unit for receiving a user manipulation, and the controller may turn off a backlight provided to the panel unit in a close state where the second body covers the first body, and provide the backlight to the panel unit in response to the panel unit being exposed as the second body is slid from the first body.

The first body may include a panel unit for receiving a user manipulation, the transparent display of the second body may include a touch panel for detecting a user touch, and the controller may perform a control operation corresponding to the user touch which is detected through the touch panel in a close state where the second body covers the first body, and perform a control operation corresponding to the user manipulation which is input through the panel unit in an open state where the panel unit is exposed as the second body is slid from the first body.

In response to outside object of the user terminal apparatus being recognized through the second area in the transparent display, the controller may display additional information regarding the outside object on the first area and displays at least one control menu on the third area.

In response to the outside object being recognized as a sign, the controller may display a map of a region corresponding to the sign on the first area as the additional information.

In response to the outside object including a text, the controller may display a translation of the text on the first area as the additional information.

The additional information may include at least one of map, text translation, address of related website, related image, and commercial content.

The controller may rotate content displayed on the second area to be bilateral symmetrical or top-bottom symmetrical according to a user manipulation.

The controller may inactivate at least one of the transparent display and the display in a close state where the second body covers the first body.

The apparatus may further include a camera formed on one of the first body and the second body, and the controller may recognize an outside object by detecting an edge of the outside object included a photographing image of the camera, and search additional information corresponding to the outside object.

The apparatus may further include a connector configured to connect the first body and the second body so that the second body is slid from the first body in phase.

A respective size of the first area and the second area may change according to a sliding phase of the second body, and the controller may display a User Interface (UI) screen in a different layout according to a size of the first area.

According to an aspect of an exemplary embodiment, there is provided a method of controlling a user terminal apparatus including a first body, a second body mounted on one side of the first body to be slidably connected to the first body, and a transparent display formed on the second body. The method may include: providing different user functions to a first area in the transparent display, which is overlaps with the first body, and a second area which is a remaining part of the transparent display in response to the second body being slid from the first body to open the first body.

The user terminal apparatus may further include a display formed on the first body, and the method may further include providing another user function to a third area in the display which does not overlap with the transparent display.

The display may be one of a light-emitting display, a reflective display and a transparent display.

The transparent display may include a touch panel for detecting a user touch, and the transparent display may display at least one control menu on the first area in the transparent display, activate the touch panel in the first area, and inactivate the touch panel in the second area.

According to the various exemplary embodiments, a user terminal apparatus including a transparent display may improve visibility of the transparent display and provide various user functions, thereby increasing user satisfaction.

BRIEF DESCRIPTION OF THE DRAWINGS

The above and/or other aspects of the inventive concept will be more apparent by describing certain exemplary embodiments of the inventive concept with reference to the accompanying drawings, in which:

FIG. 12 is a flowchart illustrating a controlling method of a user terminal apparatus according to an exemplary embodiment.

DETAILED DESCRIPTION OF THE EXEMPLARY EMBODIMENTS

Hereinafter, an exemplary embodiment will be described in detail with reference to accompanying drawings.

Figure 1A:
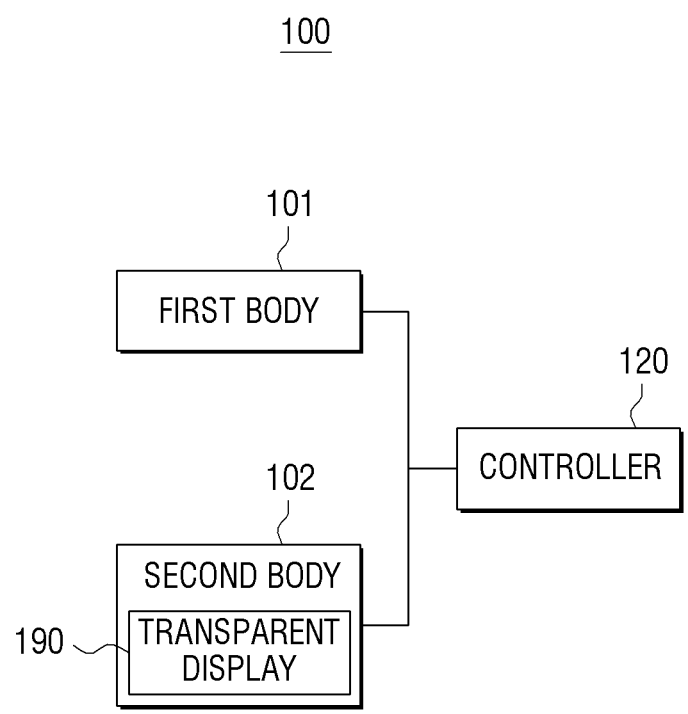
FIGS. 1A and 1B illustrate configurations of a user terminal apparatus according to exemplary embodiments.
Figure 1B:
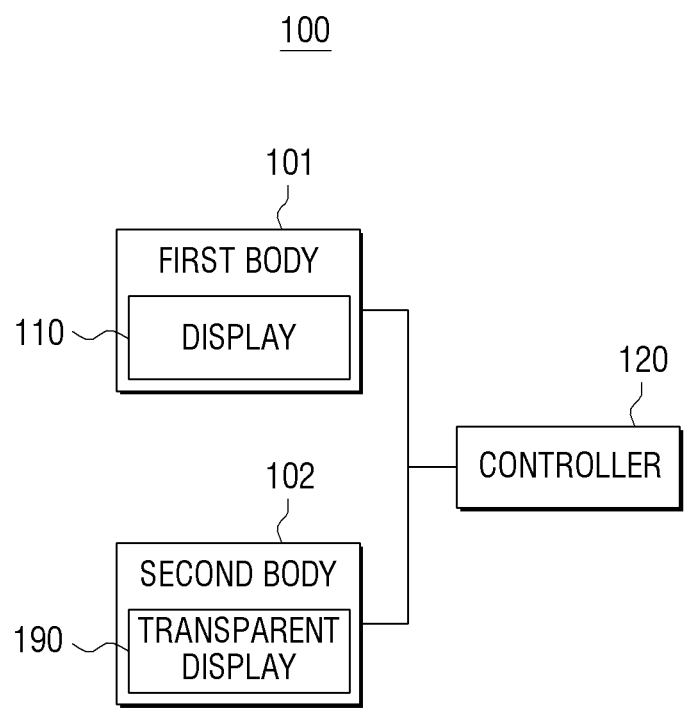

FIGS. 1A and 1B are block diagrams illustrating configuration of a user terminal apparatus according to exemplary embodiments.

A user terminal apparatus 100 according to an exemplary embodiment illustrated in FIG. 1A includes a first body 101 and a second body 102. The second body 102 includes a transparent display 190. The second body 102 may be mounted on one side of the first body 101, and may be detachably connected from the first body 101. For example, the second body 102 may be slidably connected from the first body 101, or connected in a folder structure. Herebelow, the second body 102 is described as being slidably connected from the first body 102 for convenience of explanation.

Here, the transparent display 190 has transparent properties, and thus, a user may be able to see a background image of or behind the transparent display 190 through the transparent display 190. The transparent display 190 may be formed of organic light emitting diodes (OLED), and a specific configuration of the transparent display 190 will be described later in detail.

In addition, as the transparent display 190 has transparent properties, a user may be able to see not only a background image but also part of the first body 101 through the transparent display 190. In this case, the first body 101 may cover part of the transparent display 190, and the covered part of the transparent display 190 can be seen clearer than the uncovered part, thereby improving visibility of the transparent display 190.

The first body 101 may be configured of materials and color which improves visibility of the transparent display 190. In addition, the first body 101 may have a separate display, which will be described later in detail.

Meanwhile, a controller 120 may control the transparent display 190 formed on the second body 102 to display various types of screens.

Figure 2:
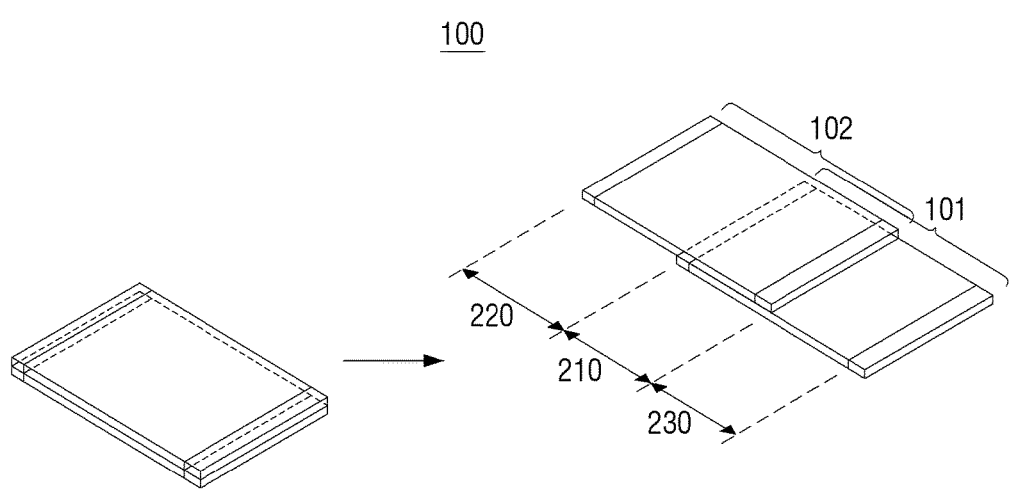
FIG. 2 illustrates divided areas of a user terminal apparatus according to an exemplary embodiment.

Specifically, if the second body 102 is slid from the first body 101 to open the first body 101, the controller 120 may provide different user functions with respect to a first area 210 (as shown in FIG. 2 as described below) in the transparent display 190 which overlaps with the first body 101 and a second area 220 (as shown in FIG. 2 as described below) which is the remaining part of the transparent display 190. Here, the user functions may be a play screen of image, text, icon, and content, an application execution screen, a web browser screen, and other graphic objects, not being limited thereto.

The first area 210 and the second area 220 may have independent sources. For example, different multi-media content display screens may be provided to the first area 210 and the second area 220, or different application play screens may be provided to the first area 210 and the second area 220.

The first area 210 or the second area 220 may be provided with various user functions such as a play screen of image, text, icon, and content, an application execution screen, a web browser screen, and other graphic objects, not being limited thereto.

In conclusion, if a user is located at one side of the transparent display 190, the user may be able to see not only the screens displayed on the transparent display 190 but also background images in a comprehensive manner. Meanwhile, the transparent display 190 may be divided into areas depending on the overlapping of the first body 101 and the second body 102, and accordingly, different user functions can be seen through a single transparent display 190.

The user terminal apparatus 100 according to another exemplary embodiment illustrated in FIG. 1B may include the first body 101 and the second body 102, and the first body 101 includes a display 110. The description regarding the elements in FIG. 1B which overlap with the elements illustrated in FIG. 1A will not be provided.

The display 110 may be an opaque display, but is not limited thereto. That is, the display 110 may be a transparent display. If the display 110 is an opaque display, the display 110 may be a light-emitting display such as OLED and liquid crystal display (LCD), or may be a light-reflecting display such as e-Paper. Meanwhile, the display 110 may be one of OLED, LCD, e-Paper, and transparent display. The configuration of the display 110 will be described later.

If the display 110 is formed on the first body 101, far more kinds of user functions can be provided. In this case, if the second body 102 is slid from the first body 101 to open the display of the first body 101, different user functions can be provided to the first area 210 in the transparent display 190 which overlaps with the display 110, the second area 220 which is the remaining part of the transparent display 190, and a third area 230 (as shown in FIG. 2 described below) which is the remaining area in the display 110.

Here, the first area 210, the second area 220, and the third area 230 may have different sources from one another. For example, different multi-media content play screens can be provided to the first area 210, the second area 220, and the third area 230, respectively. Alternatively, different application play screens can be provided to the first area 210, the second area 220, and the third area 230, respectively.

The first area 210, the second area 220 or the third area 230 may be provided with various user functions such as a play screen of image, text, icon, and content, an application execution screen, a web browser screen, and other graphic objects, not being limited thereto.

In conclusion, if a user is located at one side of the transparent display 190, the user may be able to see not only the screens displayed on the transparent display 190 but also a background image in a comprehensive manner. Meanwhile, the transparent display 190 may be divided into areas depending on the overlapping of the first body 101 and the second body 102 and accordingly, different user functions can be seen through a single transparent display 190 and the display 110.

FIG. 2 is a view provided to explain divided areas of the user terminal apparatus 100.

According to the left drawing of FIG. 2, the user terminal apparatus 100 may be in a close state where the second body 102 covers part of the first body 101. If the display 110 is formed on the first body 101 of the user terminal apparatus 100, and the user terminal apparatus 100 is in a close state, the controller 120 may minimize power consumption by inactivating at least one of the transparent display 190 and the display 110.

According to the right drawing of FIG. 2, the user terminal apparatus 100 is in an open state where the second body 102 is slid from the first body 101 to open the first body. However, this is only an example, and the second body 102 may be in a rotatable form with respect to the first body 101 to open the first body 101 or may be in a folder form to open the first body 101.

The display 110 may be formed on the first body, and the transparent display 190 may be formed on the second body. Accordingly, if the second body 102 is slid from the first body 101 to open the display 110 of the first body 101, the user terminal apparatus may be divided into the first area 210 in the transparent display 190 which overlaps with the display 110, the second area 220 which is the remaining part of the transparent display 190, and the third area 230 which is the remaining area in the display 110.

In addition, the controller 120 may provide different user functions to the first area 210, the second area 220, and the third area 230, and if the display 110 is not formed on the first body 101, the controller 120 may provide different user functions only to the first area 210 and the second area 220.

Meanwhile, the first body 101 may include a panel unit to receive a user manipulation, and the controller may turn off a backlight which is provided to the panel unit in a close state where the second body 102 covers the first body 101, and may provide a backlight to the panel unit when the second body 102 is slid from the first body to expose the panel unit.

In addition, the first body 101 may include a panel unit to receive a user manipulation, and the transparent display 190 of the second body 102 may include a touch panel to detect a user touch. The controller 120 may perform a control operation corresponding a user touch which is detected through the touch panel in a close state where the second body 102 covers the first body 101, and may perform a control operation corresponding to a user manipulation which is input through the panel unit in an open state where the second body 102 is slid from the first body 101 to expose the panel unit.

Figure 3:
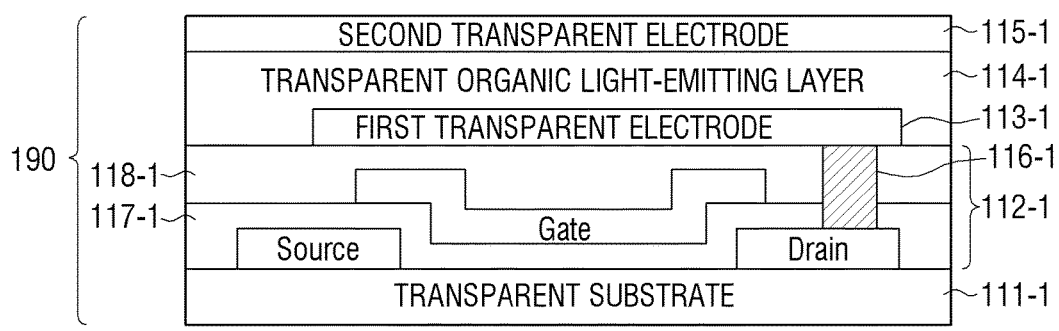
FIG. 3 illustrates a specific configuration of a transparent display according to an exemplary embodiment.

FIG. 3 is a view provided to explain various examples of specific configuration of the transparent display 190 according to an exemplary embodiment.

According to FIG. 3, the transparent display 190 may be configured in the form of a transparent OLED, and FIG. 3 illustrates an example of such configuration.

The transparent display 190 includes a transparent substrate 111-1, a transparent transistor layer 112-1, a first transparent electrode 113-1, a transparent organic light-emitting layer 114-1, a second transparent electrode 115-1, a connection electrode 116-1. Hereinafter, the detailed configuration and operation of the transparent display 190 will be described in detail.

The transparent substrate 111-1 may use a poly material such as a plastic or glass having transparent properties. The materials of the transparent substrate 111-1 may be determined based on a usage environment where the transparent display 190 is applied. For example, a polymer material which is light and flexible can be used for a mobile display apparatus, and glass is used for a show window or a general window of a shop.

The transparent transistor layer 112-1 refers to a layer including a transistor which is produced by replacing opaque silicon of the existing thin film transistor with transparent materials such as transparent iron oxides, titanium oxide, and so on. The transparent transistor layer 112-1 includes a source, a gate, a drain, and various dielectric films 117-1, 118-1, and may further include the connection electrode 116-1 which electrically connects the drain and the first transparent electrode 113-1. FIG. 3 illustrates only one transparent transistor formed of a source, a gate, and a drain in the transparent transistor layer 112-1, but actually, a plurality of transparent transistors distributed evenly on the entire area of the surface of the display may be provided.

The controller 120 may apply the above-described image source signal to the source, gate, drain, etc. of each transistor of the transparent transistor layer 112-1, scan a cell where a specific transparent transistor is disposed, and display various screens by turning on the corresponding cell. Specifically, the first transparent electrode 113-1 and the second transparent electrode 115-1 are disposed on opposite sides of the transparent organic light-emitting layer 114-1. The first transparent electrode, the transparent organic light-emitting layer, and the second transparent electrode 113-1, 114-1, 115-1 may form a transparent OLED.

The transparent OLED may be one of a passive matrix OLED and an active matrix OLED according to the driving method. The PMOLED has a structure where a pixel is formed at a part where the first and the second transparent electrodes 113-1, 115-1 cross each other. On the other hand, the AMOLED has a structure including a thin-film transistor (TFT) which drives each pixel. FIG. 3 illustrates the AMOLED.

Each of the first transparent electrode 113-1 and the second transparent electrode 115-1 includes a plurality of line electrodes, and an arrangement direction of the line electrodes is vertical with respect to one another. For example, if the line electrodes of the first transparent electrode 113-1 are arranged in a horizontal direction, the line electrodes of the second transparent electrode 115-1 are arranged in a vertical direction. Accordingly, a plurality of cross sections are formed between the first transparent electrode 113-1 and the second transparent electrode 115-1. Each cross section is connected with a transparent transistor as illustrated in FIG. 3.

The controller 120 generates a potential difference for each cross section using a transparent transistor. An electron and a hole from each electrode in a cross section where a potential difference is formed flow into the transparent organic light-emitting layer 114-1 and are combined so that light-emitting occurs. On the other hand, if light-emitting does not occur with respect to the cross section where a potential difference is not formed, the background image is shown transparently.

Indium Tin oxide (ITO) or a new material such as graphene may be used for the first and the second transparent electrodes 113-1, 115-1. Graphene refers to a material with transparent properties as it has a flat structure in the form of beehive where a carbon atom is interconnected. In addition, the transparent organic light-emitting layer 114-1 may also be realized by various materials.

Figure 4A:
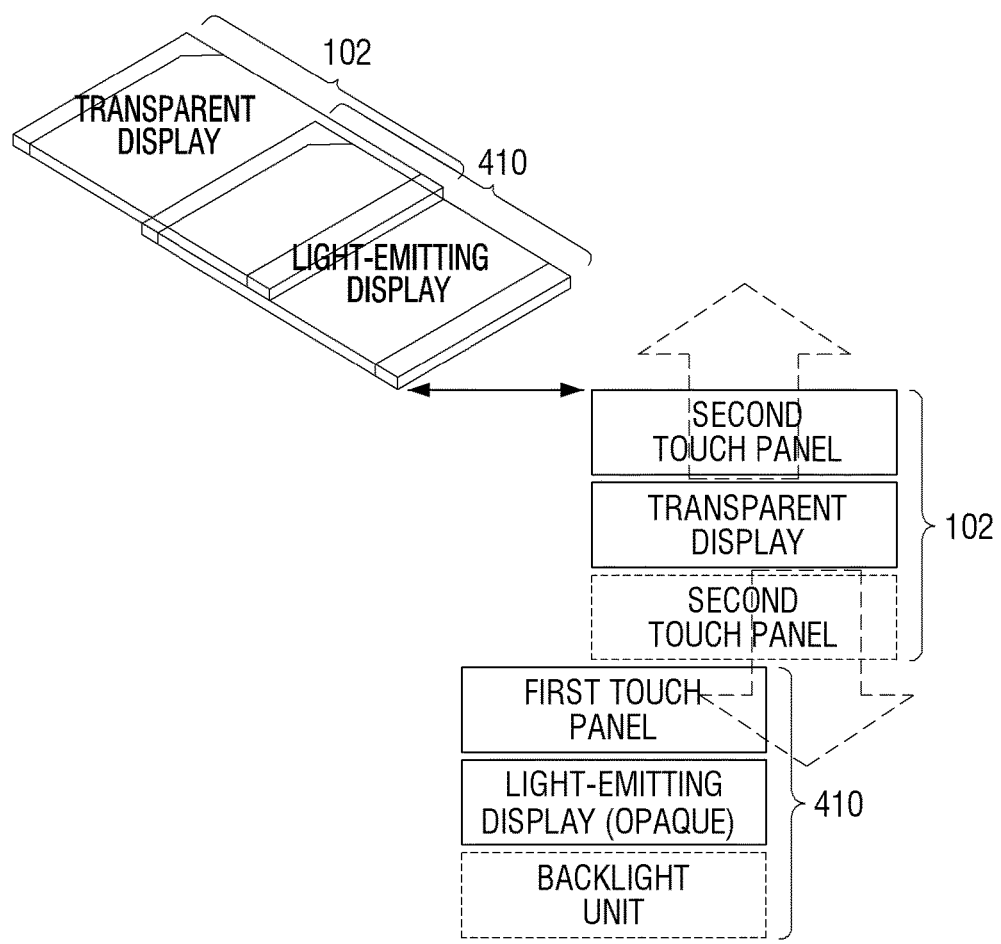
FIGS. 4A to 4C illustrate various configurations of a user terminal apparatus where a display is formed on a first body according to exemplary embodiments.
Figure 4B:
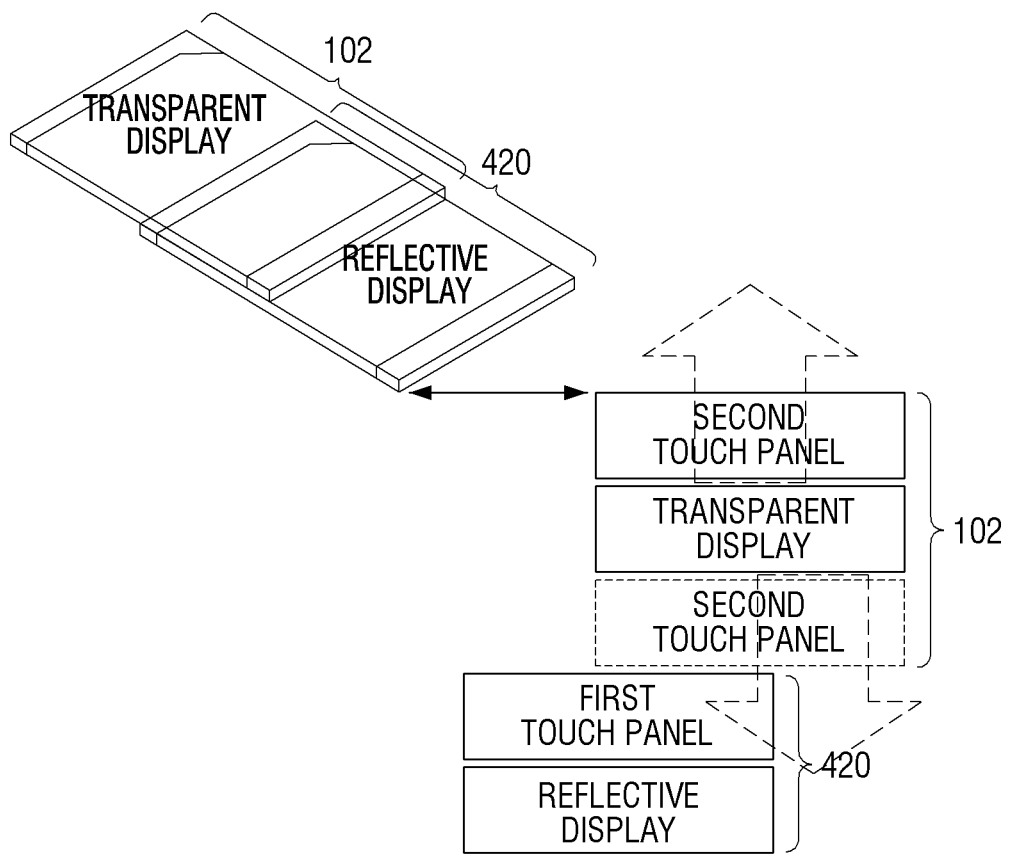
Figure 4C:
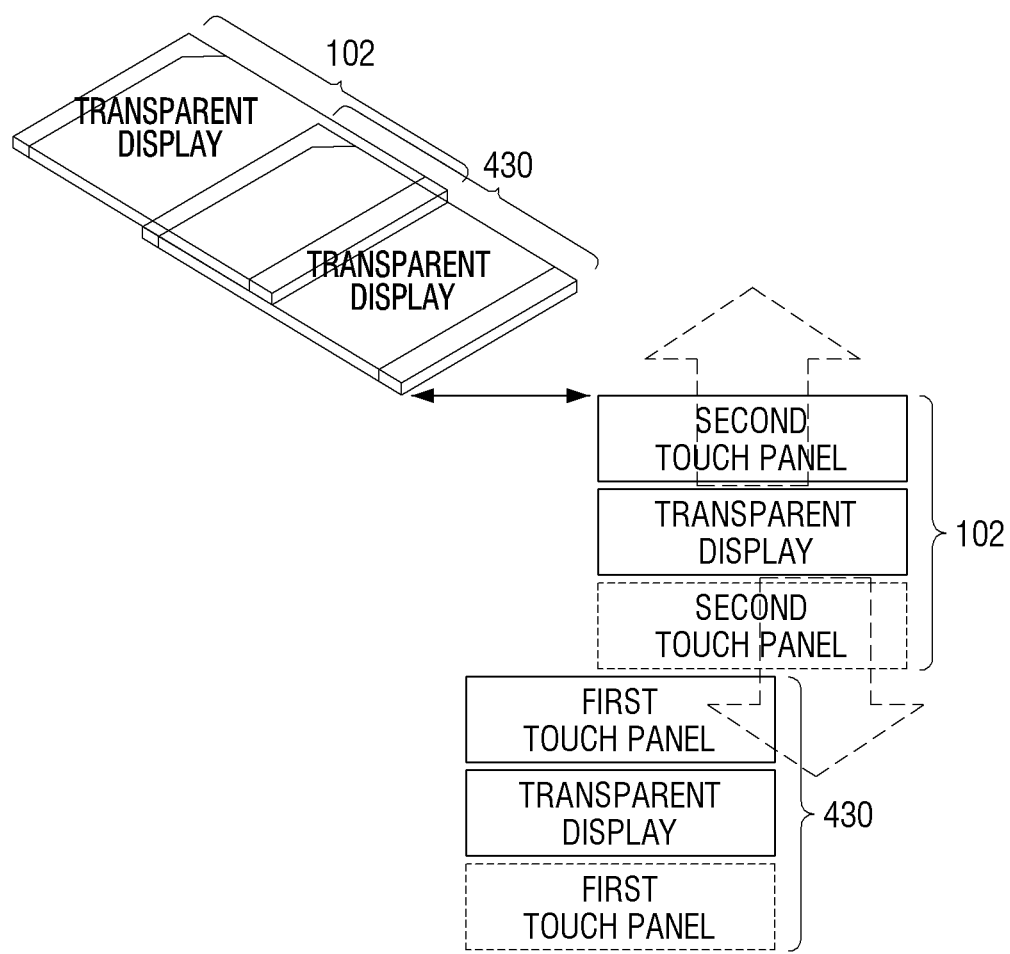

FIGS. 4A, 4B and 4C illustrate various configurations of a user terminal apparatus where the display 110 is formed on the first body 101 according to exemplary embodiments.

According to an exemplary embodiment illustrated in FIG. 4A, the transparent display 190 is formed on the second body 102, and a light-emitting display 410 is formed on the first body 101. The transparent display 190 includes a transparent display and a touch panel on a side which is opposite to a side contacting the light-emitting display 410 so that a user manipulation can be performed through a touch. In addition, the transparent display 190 may include another touch panel on the side contacting the light-emitting display 410, and if the user terminal apparatus 100 is used with another user facing with each other by sharing the user terminal apparatus 100, another user may control the user terminal apparatus 100 through the other touch panel.

Meanwhile, the light-emitting display 410 formed on the first body may be formed of a touch panel, a light-emitting display, and a backlight unit for providing a light source to the light-emitting display.

As the light-emitting display 410 is opaque, if the second body 102 is slid from the first body to open the first body 101, the visibility of the first area 210 in the transparent display 190 which overlaps with the first body can be improved. Specifically, a user may see a surrounding environment through the transparent display 190, but as part of the transparent display 190 is covered by the light-emitting display 410 in the first area 210 in the transparent display 190 which overlaps with the first body 101, the user may not see the surrounding environment and may be able to see only the screen displayed on the transparent display 190.

If the user terminal apparatus 100 is shared with another user, only the second area 220 which is transparent can be shared with the other user, and the first area 210 and the third area 230 which are covered by the opaque light-emitting display 310, and thus, not shown to the other user can be used for individual purposes.

According to another exemplary embodiment illustrated in FIG. 4B, the transparent display 190 is formed on the second body 102, and a reflective display 420 is formed on the first body 101.

The reflective display 420 formed on the first body 101 may include a touch panel and a reflective display.

As the reflective display 420 is opaque, if the second body 102 is slid from the first body 101 to open the first body 101, the user's visibility of the first area 210 in the transparent display 190 which overlaps with the first body 101 may be enhanced in the same manner as FIG. 4A. If the user terminal apparatus 100 is shared with another user, only the second area 220 which is transparent can be shared with another user, and the first area 210 and the third area 230 which are covered by the opaque reflective display 420, and thus, not shown to the other user can be used for individual purposes.

According to another exemplary embodiment illustrated in FIG. 4C, the transparent display 190 is formed on the second body 102, and a transparent display 430 is formed on the first body 101.

The transparent display 430 formed on the first body 101 includes a transparent display and a touch panel on a side facing the transparent display 190 of the second body 102 so that a user manipulation can be performed through a touch. In addition, the transparent display 430 may include another touch panel on a side which is opposite to a side facing the transparent display 190 of the second body 102, and if the user terminal apparatus 100 is used with another user facing with each other by sharing the user terminal apparatus 100, the other user may control the user terminal apparatus 100 through the other touch panel.

If the transparent display 430 is formed on the first body 101, the user's visibility for the first area 210 and the third area 230 may be deteriorated more than when the display 110 is opaque. However, the visibility can be enhanced by displaying the transparent display 430 formed on the first body 101 in black.

In addition, when the user terminal apparatus 100 is shared with another user, not only the second area 220 but also the first area 210 and the third area 230 may be shared with the other user. However, as described above, the transparent display 430 formed on the first body 101 is displayed in black so that the first area 210 and the third area 230 can be used for individual purposes.

Figure 5:
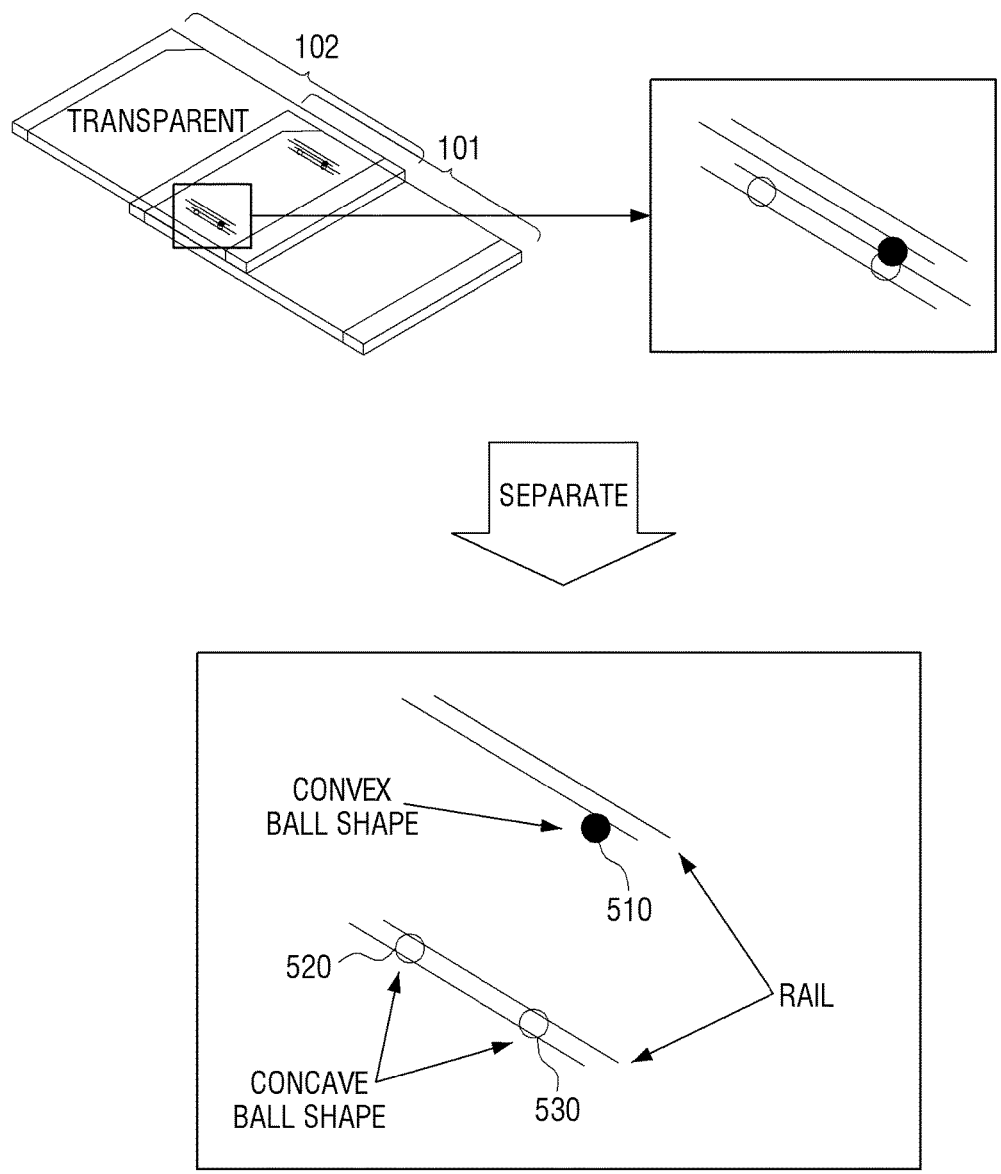
FIG. 5 illustrates a connector which connects a first body and a second body according to an exemplary embodiment.

FIG. 5 illustrates a connector which connects the first body 101 and the second body 102 according to an exemplary embodiment.

According to FIG. 5, the connector which connects the first body 101 and the second body 102 may be configured in a sliding form, but this is only an example. The second body 102 may be in a rotatable form with respect to the first body 101 to open the first body 101 or may be in a folder form to open the first body 101. Hereinafter, only the sliding form will be described for convenience of explanation.

There may be a rail between the first body 101 and the second body 102. In particular, the rail of the second body 102 may be protruded, and the rail of the first body 102 may be caved in, or vice versa. In addition, a rail may be formed not only between the first body 101 and the second body but also on the side of the first body 101 and the second body 102, connecting the first body 101 and the second body 102.

A groove in the shape of convex ball 510 may be formed on the rail of the second body 102, and a groove in the form of concave ball 520, 530 may be formed on the rail of the first body 101, or vice versa. In addition, the groove may be provided not only in the form of ball but also in the form of triangular pyramid, and there may be two or more grooves in the shape of concave ball.

The user terminal apparatus 100 may slide in phase through the above-described sliding structure. The size of each of the first area 210, the second area 220 and the third area 230 may change through the phased sliding of the first body 101 and the second body 102, and the controller 120 may display a user interface (UI) screen in a different layout for each size of the first area 210 on the first area 210.

Figure 6A:
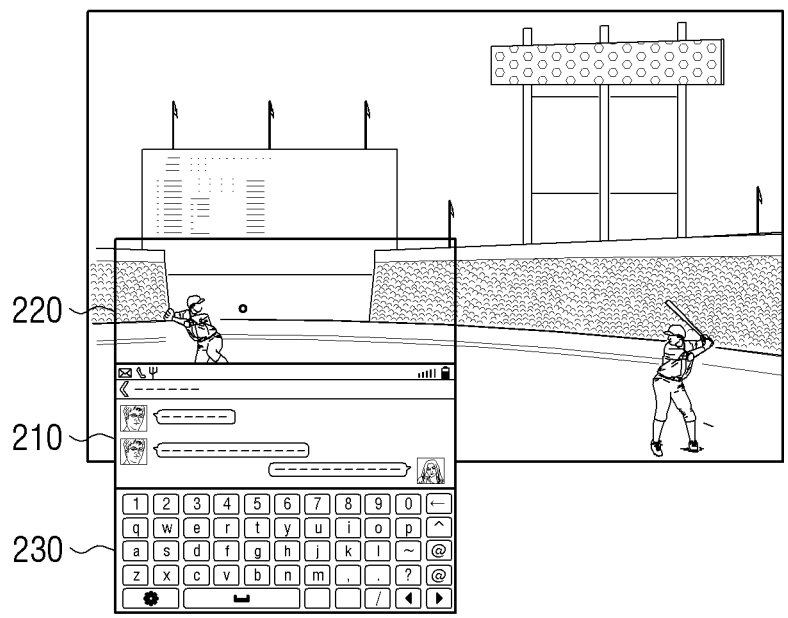
FIGS. 6A and 6B illustrate a control menu for controlling a first area and a second area in a third area according to exemplary embodiments.
Figure 6B:
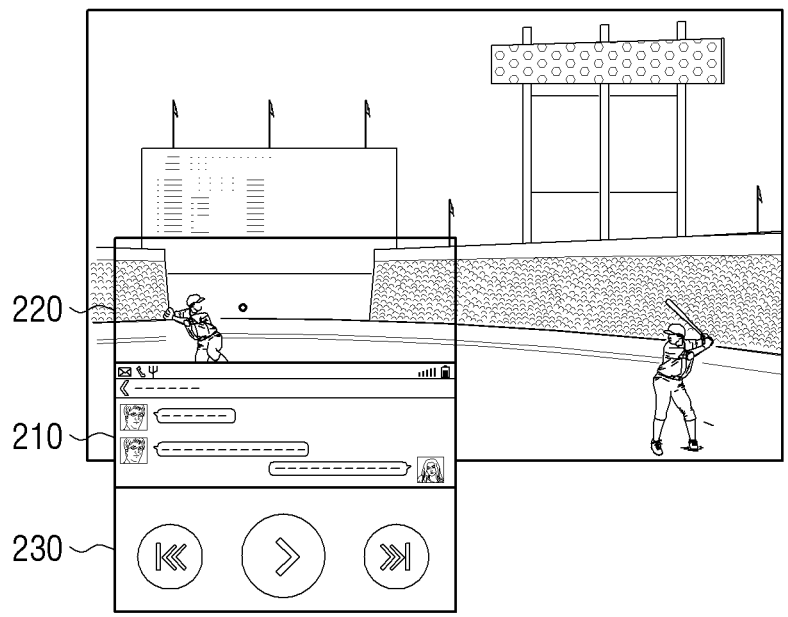

FIGS. 6A and 6B illustrate a control menu for controlling the first area 210 and the second area 220 in the third area 230 according to exemplary embodiments.

According to an exemplary embodiment illustrated in FIG. 6A, while performing a job on the first area 210 and the third area 230, a user may see a surrounding environment through the transparent second area 220 without being distracted.

Specifically, a specific content may be provided on the first area 210, and a control menu for controlling a content displayed on the first area 210 may be provided on the third area 230 for the user to perform a corresponding job. If the user wishes to see the surrounding environment, the user may use the transparent second area 220. In this case, the touch pane of the first area 210 and the second area 220 where a user's touch input is not received may be inactivated, minimizing power consumption.

According to another exemplary embodiment illustrated in FIG. 6B, the second area 220 may be used to check a surrounding environment and then, through a control on the third area 230, a desired image can be displayed on the second area 220.

Specifically, the controller 120 may control to display a control menu for controlling the second area 220 according to a user command while a control menu for controlling the first area 210 is displayed on the third area 230. In this case, an image which can be controlled by the control menu displayed on the third area 230 may be displayed on the second area 220.

However, this is only an example, and a control menu for controlling not only a moving image but also web browser, navigation, etc. may be provided to the third area 230. In this case, the controller 120 may inactivate a touch panel formed on the transparent display 190 in order to minimize unnecessary power consumption.

Figure 7A:
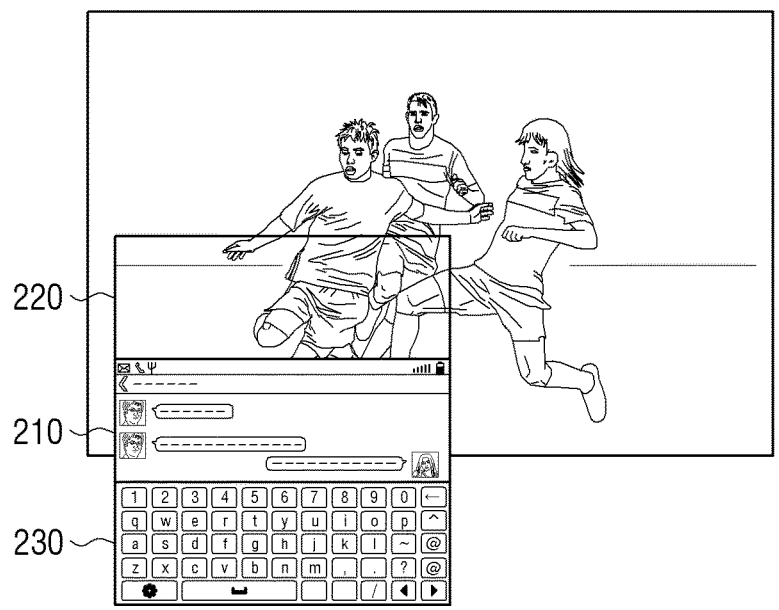
FIGS. 7A to 7C illustrate utilizing a transparent display according to exemplary embodiments.
Figure 7B:
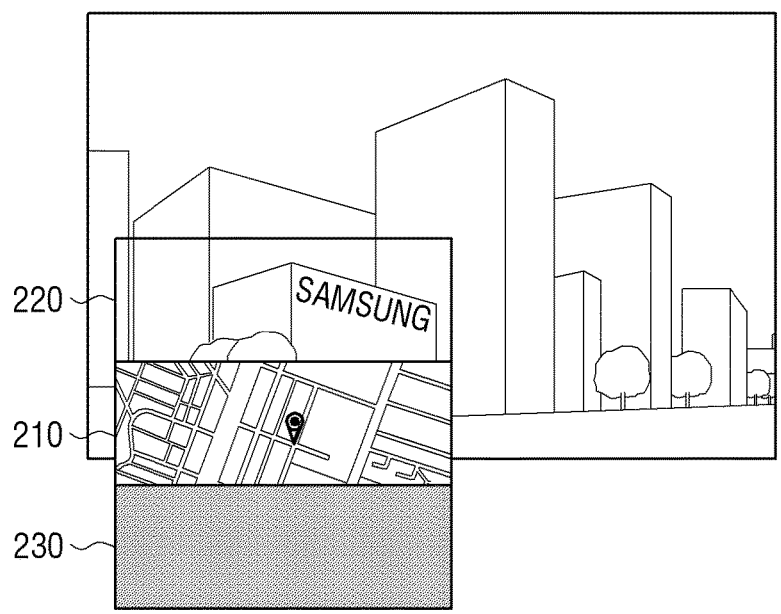
Figure 7C:
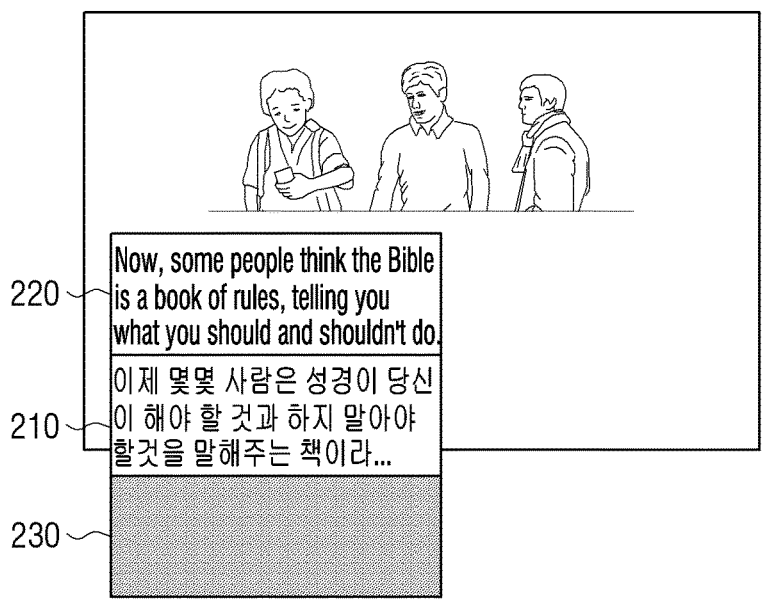

FIGS. 7A, 7B and 7C illustrates utilizing a transparent display according to exemplary embodiments.

According to an exemplary embodiment illustrated in FIG. 7A, while performing a job on the first area 210 and the third area 230, a user may see a surrounding environment through the transparent second area 220 without being distracted, which is similar to the configuration of FIG. 6A and thus, further description will not be provided.

According to another exemplary embodiment illustrated in FIG. 7B, a user may recognize an object outside the user terminal apparatus 100 through the second area 220 of the transparent display 190. Accordingly, the controller 120 may display additional information related to the outside object on the first area 210, and display at least one control menu on the third area 230.

In particular, if it is acknowledged that the outside object is a sign, the controller 120 may display a map of the region corresponding to the sign on the first area 210 as additional information. In addition, according to another exemplary embodiment illustrated in FIG. 7C, if it is acknowledged that the outside object includes a text in a particular language (e.g., English), the controller 120 may display a translation of the text in another language (e.g., Korean) on the first area 210 as additional information. However, this is only an example, and additional information may be at least of one of map, text translation, address of related website, related image and commercial content.

In order to provide the above function, the user terminal apparatus 100 may include a camera in one of the first body 101 and the second body 102. The image photographed by the camera may be different from the image which is recognized by a user through the second area 220. The controller 120 may recognize an outside object by detecting an edge of the outside object in an image which is recognized through the second area 220 by a user with respect to an image photographed by the camera, and search additional information corresponding to the outside object.

Figure 8A:
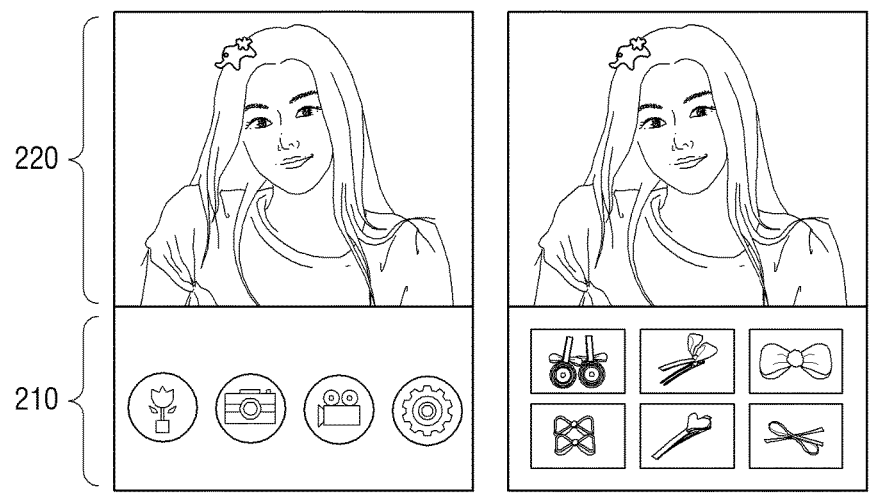
FIGS. 8A and 8B illustrate an augmented reality function and a sharing function according to exemplary embodiments.
Figure 8B:
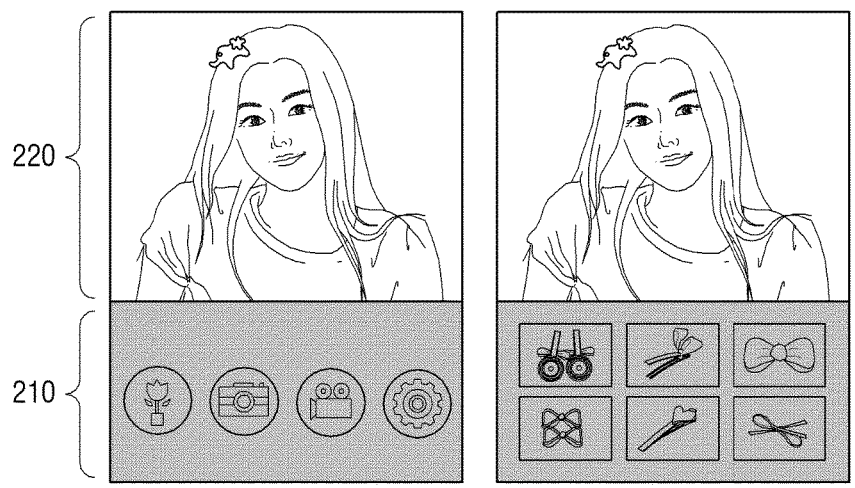

FIGS. 8A and 8B illustrate an augmented reality function and a sharing function according to exemplary embodiments.

According to an exemplary embodiment illustrated in FIG. 8A, it is assumed that a transparent display 430 is formed on the first body 101. Accordingly, the first area 210 may be shown to another user and may share a control menu.

In addition, a user may check an object to be photographed through the second area 220. In this case, the user may see the image recognized by the controller 120 as the image displayed through the second area 220, but may also see an outside image directly through the transparent display 190 without any display on the second area 220.

If a user sees an outside image directly without any display on the second area 220, the image recognized by the controller 120 through a camera may be different from the image which is recognized by the user through the second area 220. Accordingly, the controller 120 may change the size of the image photographed by the camera to the size of image recognized through the second area 220.

Meanwhile, the first area 210 may provide a control menu including at least one of a still image photographing button, a moving image photographing button and an augmented reality photographing button. If the augmented reality photographing button is selected, a control menu for selecting augmented reality effects may be provided on the first area 210 on the right side of FIG. 8A. If one augmented reality effect is selected, the selected effect may be overlapped on the image which is recognized through the transparent display 190 and displayed on the second area 220.

According to another exemplary embodiment illustrated in FIG. 8B, it is assumed that a light-emitting display 410 or a reflective display 420 is formed on the first body 101, making the first body opaque. In this case, if the second area 220 which is transparent is shared with another user, the other user may also recognize an image to be photographed, but may not share the control menu since the first area 210 is opaque. Accordingly, the other user may not recognize a photographing mode and an augmented reality effect, so they can be manipulated only by the user.

However, not only when the light-emitting display 410 or the reflective display 420 is formed on the first body 101 but also when the transparent display 430 is formed on the first body 101, a similar effect can be obtained by displaying the transparent display 430 in black.

Meanwhile, if at least one control menu is displayed on the first area 210 of the transparent display 190 as illustrated in FIGS. 8A and 8B, the controller 120 may activate a touch panel area corresponding to the first area 210 and inactivate a touch panel area corresponding to the second area 220, thereby minimizing power consumption.

Figure 9A:
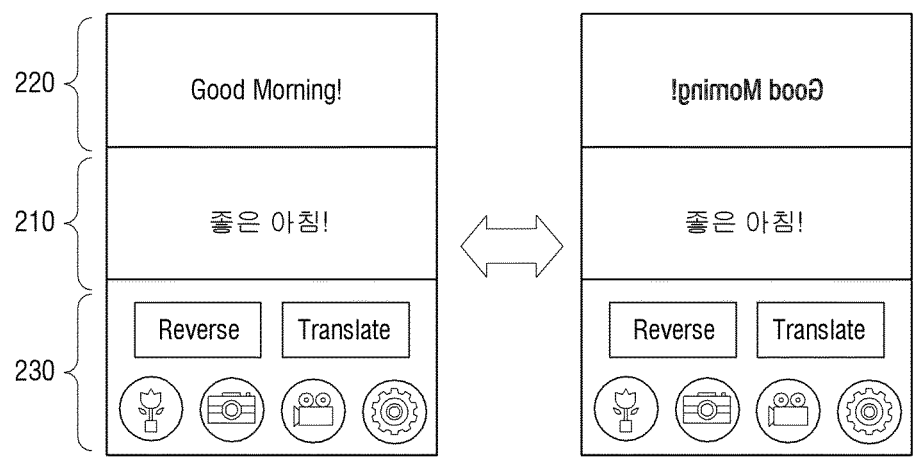
FIGS. 9A to 9C illustrate a sharing function according to exemplary embodiments.
Figure 9B:
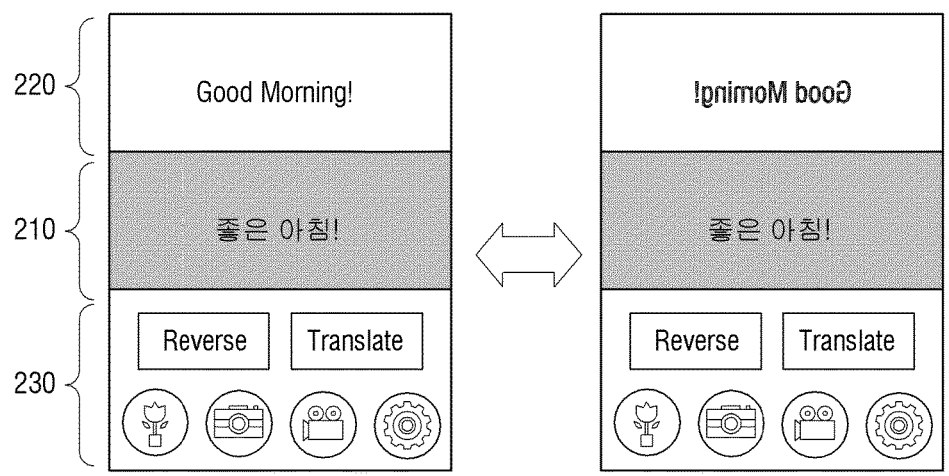
Figure 9C:
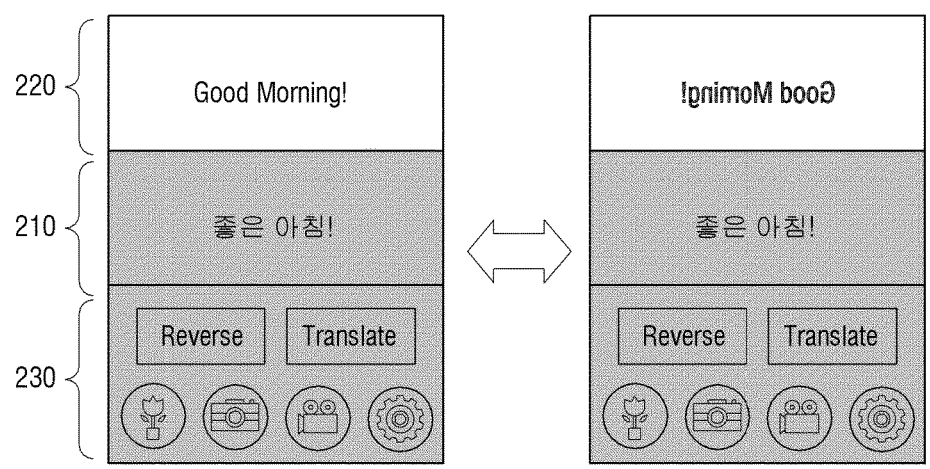

FIGS. 9A, 9B and 9C illustrate a sharing function according to exemplary embodiments.

According to an exemplary embodiment illustrated in FIG. 9A, if the transparent display 430 is formed on the first body 101, various user functions can be provided. In this case, the first area 210 can be shown to another user through the transparent display 430 formed on the first body 101, and a control menu can be shared through the third area 230.

If a text in a particular language (e.g., English) is displayed on the second area 220 and its translation in another language (e.g., Korean) is displayed on the first area 210, a control menu can be provided on the third area 230. In this case, a user may share with another user facing each other all contents displayed on the first area 210, the second area 220 and the third are 230, and the other user may select a desired function through the control menu for controlling the user terminal apparatus 100.

Meanwhile, according to the right drawing in FIG. 9A, the controller 120 may rotate a content displayed on the second area 220 to be bilateral symmetrical based on a user manipulation. However, this is only an example, and the controller 120 may rotate a content to be not only bilateral symmetrical but also top and bottom symmetrical. Accordingly, a user may provide a shared content in a form which is convenient for the other user to recognize.

According to another exemplary embodiment illustrated in FIG. 9B, the transparent display 430 is formed on the first body 101, and the controller 120 may control such that only the first area 210 cannot be shown to the other user. Specifically, the controller 120 may display only an area corresponding to the first area 210 in the transparent display 430 formed on the first body 101 in black so that the first area 210 cannot be shown to the other user. Thus, the user may not share all functions, and may user the first area 210 for personal purposes.

According to another exemplary embodiment illustrated in FIG. 9C, not only the first area 210 but also the third area 230 may not be shared with the other user. The controller 120 may not share all functions with another user by displaying the entire area of the transparent display 430 formed on the first body 101 in black. However, this is only an example, the controller 120 may obtain a similar effect by forming the light-emitting display 410 or the reflective display 420 on the first body 101 instead of the transparent display 430.

According to FIGS. 9B and 9C, as the second area 220 is transparent, the other user may also recognize an image to be photographed. However, a control menu cannot be shared as the first area 210 of FIG. 9C or the first area 210 and the third area 230 of FIG. 9C are opaque. Accordingly, the other user may not recognize a translation result or a control menu, so they can be manipulated only by the user.

Meanwhile, if at least one control menu is displayed on the third area 230 as illustrated in FIGS. 9A to 9C, the controller 120 may inactivate a touch panel formed on the transparent display 190, thereby minimizing power consumption.

Figure 10A:
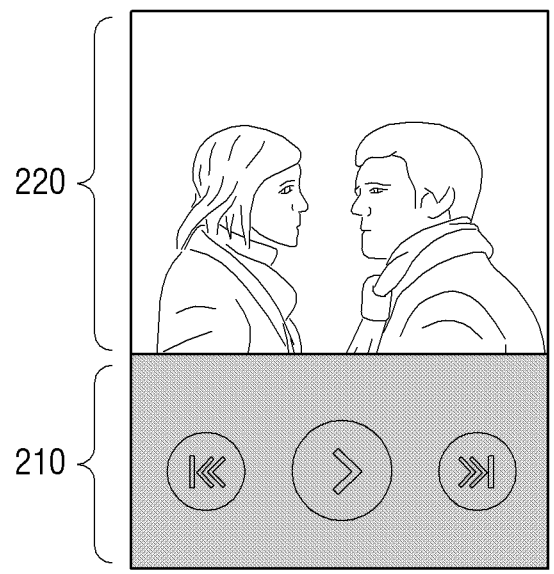
FIGS. 10A to 10C illustrate another sharing function according to exemplary embodiments.
Figure 10B:
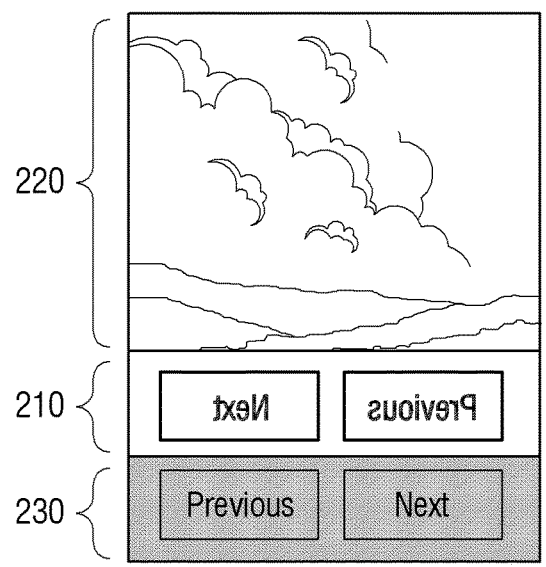
Figure 10C:
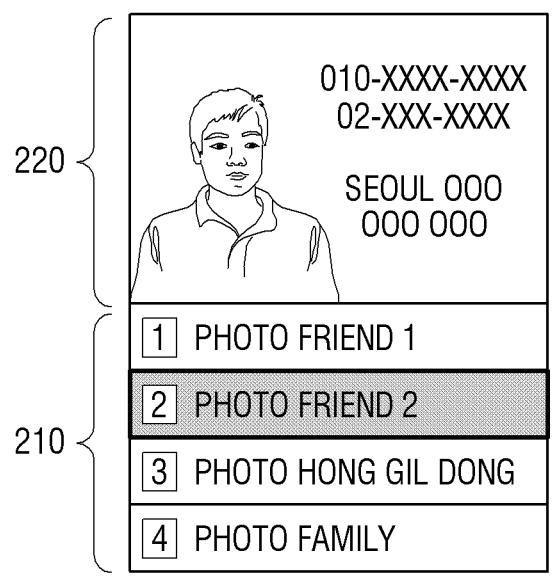

FIGS. 10A, 10B and 10C illustrate another sharing function according to exemplary embodiments.

According to an exemplary embodiment illustrated in FIG. 10A, a user may share a moving image content with another user. The moving image content is displayed on the second area 220 of the transparent display 190, and the user may watch the moving image content with another user facing with each other.

Meanwhile, the first area 210 may provide a control menu for controlling the moving image content. If the transparent display 430 is formed on the first body 101, the first area 210 can be shared with the other user.

Even if the transparent display 430 is formed on the first body 101, it is possible not to share all functions with the other user by displaying the transparent display 430 in black. However, this is only an example, and a similar effect can be obtained by forming the light-emitting display 410 or the reflective display 420 on the first body 101 instead of the transparent display 430.

Meanwhile, if at least one control menu is displayed on the first area 210, the controller 120 may activate a touch panel area corresponding to the first area 210 and inactivate a touch panel area corresponding to the second area 220, thereby minimizing power consumption.

According to another exemplary embodiment illustrated in FIG. 10B, a user may share an image with the other user. An image can be displayed on the second area 220 of the transparent display 190, and a user may watch the image with the other user facing each other.

Meanwhile, a control menu for controlling the image can be provided on the first area 210 and the third area 230. The controller 120 may provide a control menu which is rotated to be bilateral symmetrical on the first area 210, and the other user may manipulate the user terminal apparatus 100 through the control menu. In addition, the controller 120 may provide the control menu on the third area 230 as well, and the user may manipulate the user terminal apparatus 100 through the control menu.

Unlike the first area 210 which is manipulated by the other user, the third area 230 is manipulated by the user, the user may not share the function of the third area 230 with the other user by displaying only the area corresponding to the third area 230 on the display 110 formed on the first body 101 in black.

Meanwhile, if at least one control menu is displayed on the first area 210 and the third area 230, the controller 120 may activate a touch panel area corresponding to the first area 210 and a touch panel area corresponding to the third area 210 and inactivate a touch panel area corresponding to the second area 220, thereby minimizing power consumption.

According to another exemplary embodiment illustrated in FIG. 10C, a user may share an address book with the other user. The address book is displayed on the second area 220 of the transparent display 190, and the user may share the address book with the other user facing each other.

Meanwhile, the first area 210 may provide a control menu for selecting a specific address book from among address books. If the transparent display 430 is formed on the first body 101, the first area 210 can be shared with the other user.

Even if the transparent display 430 is formed on the first body 101, the user may share only a part of address books with the other user by making only the parts to be shared with the other user transparent and displaying the remaining parts in black.

Meanwhile, if at least one control menu is displayed on the first area 210, the controller 120 may activate a touch panel area corresponding to the first area 210 and inactivate a touch panel area corresponding to the second area 220, thereby minimizing power consumption.

Figure 11:
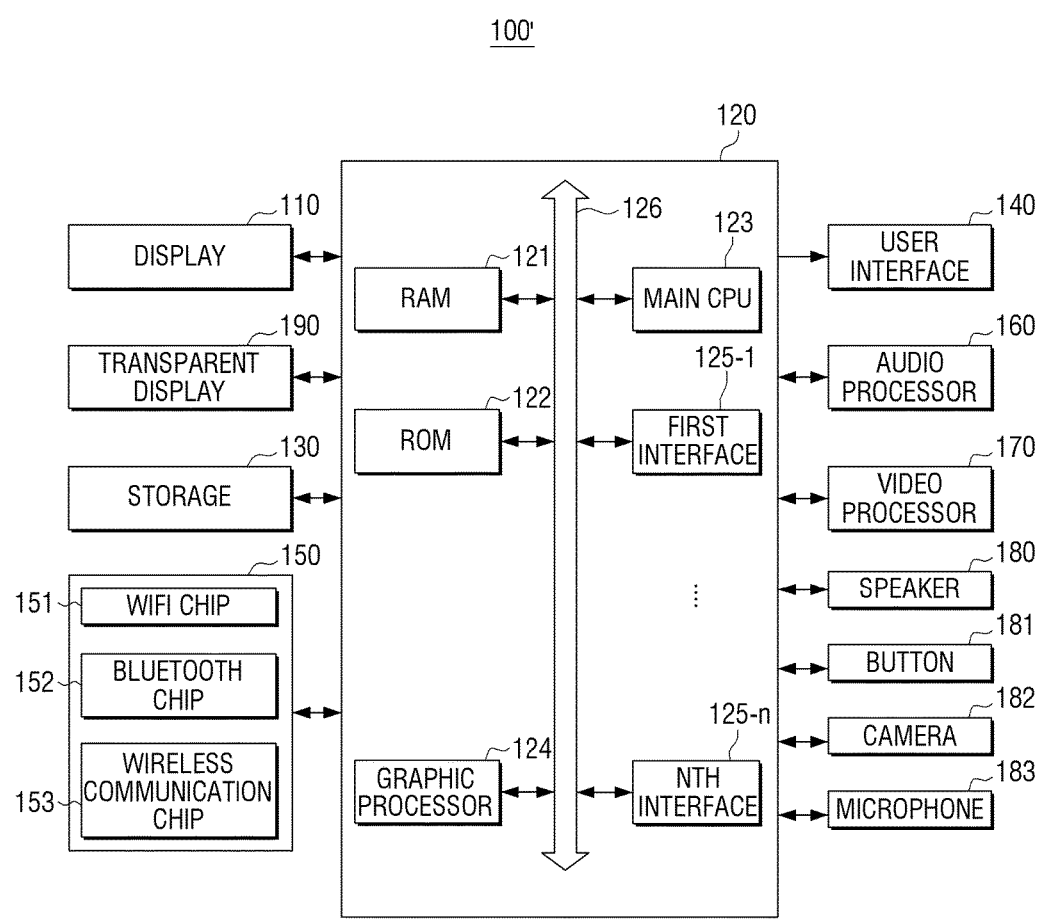
FIG. 11 is a block diagram illustrating configuration of a user terminal apparatus according to an exemplary embodiment.

FIG. 11 is a block diagram illustrating a configuration of a user terminal apparatus 100' according to an exemplary embodiment. According to FIG. 11, the user terminal apparatus 100' includes the display 110, the controller 120, a storage 130, a user interface 140, a communicator 150, an audio processor 160, a video processor 170, a speaker 190, a button 181, a camera 182, a microphone 183, and a transparent display 190. From the elements illustrated in FIG. 11, the elements which overlap with those illustrated in FIG. 1 will not be described in detail.

The controller 120 controls overall operations of the user terminal apparatus 100' using various programs stored therein.

Specifically, the controller 120 includes a random access memory (RAM) 121, a read-only memory (ROM) 122, a main central processing unit (CPU) 123, a graphic processor 124, and a first to nth interface 125-1-125-$n$, and a bus 126.

The RAM 121, the ROM 122, the main CPU 123, and the graphic processor 124, and the first to the $n^{th}$ interface 125-1-125-$n$ may be interconnected through the bus 126.

The first to the $n^{th}$ interface 125-1-125-$n$ are connected to the above-described various elements. One of the interfaces may be a network interface which is connected to an external apparatus via network.

The main CPU 123 accesses the storage 130, and performs booting using an operating system (O/S) stored in the storage 130. In addition, the main CPU 143 performs various operations using various programs, web contents, data, etc. stored in the storage 130.

The ROM 122 stores a set of commands for system booting. If a turn-on command is input and thus, power is supplied, the main CPU 123 copies O/S stored in the storage 130 in the RAM 121 according to a command stored in the ROM 122, and boots a system by executing the O/S. When the booting is completed, the main CPU 123 copies various application programs stored in the storage 130 in the RAM 121, and performs various operations by executing the application programs copied in the RAM 121.

The graphic processor 124 generates a screen including various objects such as an icon, an image, a text, etc. using a computing unit (not shown) and a rendering unit (not shown). The computing unit computes property values such as coordinates, shape, size, and color of each object to be displayed according to the layout of the screen using a control command received from the input unit 380. The rendering unit generates a screen with various layouts including objects based on the property values computed by the computing unit. The screen generated by the rendering unit is displayed within the display area of the display 110 or the transparent display 190.

Meanwhile, the operation of the above-described controller 120 may be performed by a program stored in the storage 130.

The storage 130 stores various data such as an O/S software module to drive the user terminal apparatus 100', UI information to be provided in a divided area, a user function and so on.

In this case, the controller 120 may provide a user function in each area based on information stored in the storage 130. In addition, a sharing function can be limited by displaying a part of areas in black upon a user's request.

The user interface 140 receives a user command. Herein, the user interface 140 may be realized in various forms such as a remote control receiver, a button unit, a touch pad and so on.

The display 110 and the transparent display 190 display various screens. Here, the screens may include a screen for playing various contents such as image, moving image, text, music, etc., a screen for playing an application play including various contents, a graphic user interface (GUI) screen and so on.

In this case, the display 110 and the transparent display 190 may be realized as a liquid crystal display (LCD) panel, an organic light emitting diodes (OLED) and so on, but is not limited thereto. In addition, the display 110 and the transparent display 190 may be realized as a flexible display and so on, depending on circumstances.

In particular, the display 110 and the transparent display 190 may display a received moving image under the control of the controller 120.

FIG. 12 is a flowchart illustrating a controlling method of the user terminal apparatus 100 according to an exemplary embodiment.

According to FIG. 12, the user terminal apparatus 100 determines whether the second body 102 is slid from the first body 101 to open the first body 101 (S1210). If the first body 101 is opened, different user functions may be provided to the first area 210 in the transparent display 190 which overlaps with the first body 101 and the second area 220 which is the remaining parts of the transparent display 190, respectively (S1220).

Meanwhile, if the first body 101 is not opened, the user terminal apparatus 100 determines whether there is a user input (S1230), and if it is determined that there is a user input, the user terminal apparatus 100 may provide a user function to the transparent display 190 (S1240). However, if it is determined that there is no user input, the transparent display 190 may be inactivated.

The user terminal apparatus 100 further includes the display 110 formed on the first body 101, and the step S1220 for providing a different user function may include, in response to the second body 102 being slid from the first body 101 to open the display 110 of the first body 101, providing a different user function to the first area 210 in the transparent display 190 which overlaps with the display 110, the second area 220 which is the remaining part of the transparent display 190, and the third area 230 which is the remaining part of the display 110.

The display 110 may be one of an OLED, LCD, e-paper, and transparent display.

The transparent display 190 may include a touch panel for detecting a user touch, display at least one control menu on the first area 210 of the transparent display 190, activate a touch panel area corresponding to the first area 210, and inactivate a touch panel area corresponding to the second area 220.

Meanwhile, the method for controlling a user terminal apparatus according to the above-described various exemplary embodiments may be realized as a program code which is executable by a computer, and the program code may be stored in various non-transitory computer readable media and provided to each device so as to be executed by a processor.

For example, there may be provided a non-transitory computer readable medium in which a program for providing a different user function to the first area in the transparent display which overlaps with the first body and the second area which is the remaining part of the transparent display is stored in response to the second body being slid from the first body to open the first body.

The non-transitory computer readable medium refers to a medium which may store data semi-permanently rather than storing data for a short time such as a register, a cache, and a memory and may be readable by an apparatus. Specifically, the above-described various applications or programs may be stored and provided in a non-transitory recordable medium such as compact disc (CD), digital versatile disk (DVD), hard disk, Blu-ray disk, universal serial bus (USB), memory card, ROM, etc.

The foregoing exemplary embodiments and advantages are merely exemplary and are not to be construed as limiting the inventive concept. The exemplary embodiments can be readily applied to other types of apparatuses. Also, the description of the exemplary embodiments of the inventive concept is intended to be illustrative, and not to limit the scope of the claims, and many alternatives, modifications, and variations will be apparent to those skilled in the art.

What is claimed is:

1. A user terminal apparatus comprising:
a first body;
a second body mounted on one side of the first body to be slidably connected to the first body;
a transparent display formed on the second body;
a display formed on the first body, and
a controller configured to:
identify the second body being slid from the first body to open the first body to form a first area and a second area in the transparent display, and
based on the identification, provide different functions to the first area and the second area, respectively,
wherein the first area is an area in the transparent display, which overlaps with the first body, and the second area is an area which is a remaining part of the transparent display,
wherein the transparent display comprises a touch panel configured to receive a user touch,
wherein the controller is configured to, based on at least one control menu being displayed only on the first area, activate a partial area of the touch panel corresponding to the first area, and inactivate a remaining area of the touch panel corresponding to the second area on which a first content is displayed,
wherein the controller is configured to display a second content, symmetrical to the first content, on at least one of the first area and the second area based on a user manipulation,
wherein the controller is further configured to:
provide another function to a third area in the display which does not overlap with the transparent display,
based on an outside object being recognized through the second area in the transparent display, control the display to display additional information regarding the outside object on the first area and display at least one control menu on the third area,
based on the outside object being recognized as a sign, control the display to display a map of a region corresponding to the sign on the first area as the additional information, and
based on the outside object including a text, control the display to display a translation of the text on the first area as the additional information, and
wherein the additional information comprises at least one of a map, text translation, an address of a related website, a related image, and a commercial content.

2. The apparatus of claim 1, wherein the display is one of a light-emitting display, a reflective display and a transparent display.

3. The apparatus of claim 1, wherein the controller is configured to display a control menu on the third area for controlling the first area and the second area, and inactivate the touch panel.

4. The apparatus of claim 1, wherein the first body comprises a panel unit configured to receive a user manipulation, and
wherein the controller is further configured to turn off a backlight provided to the panel unit in a close state where the second body covers the first body, and provide the backlight to the panel unit based on the panel unit being exposed as the second body is slid from the first body.

5. The apparatus of claim 1, wherein the first body comprises a panel unit configured to receive a user manipulation,
wherein the controller is further configured to perform a control operation corresponding to the user touch which is received through the touch panel in a close state where the second body covers the first body, and perform a control operation corresponding to the user manipulation which is input through the panel unit in an open state where the panel unit is exposed as the second body is slid from the first body.

6. The apparatus of claim 1, wherein the controller is configured to inactivate at least one of the transparent display and the display in a close state where the second body covers the first body.

7. The apparatus of claim 1, further comprising:
a camera formed on one of the first body and the second body,
wherein the controller is configured to recognize the outside object by identifying an edge of the outside object included in a photographing image of the camera, and search for additional information corresponding to the outside object.

8. The apparatus of claim 1, further comprising a connector configured to connect the first body and the second body so that the second body is slid from the first body in phase.

9. The apparatus of claim 8, wherein respective sizes of the first area and the second area change according to a sliding phase of the second body, and
wherein the controller is configured to display a user interface (UI) screen in a different layout according to a size of the first area.

10. A method of controlling a user terminal apparatus including a first body, a second body mounted on one side of the first body to be slidably connected to the first body, a transparent display formed on the second body and a display formed on the first body, the method comprising:
controlling to identify the second body being slid from the first body to open the first body to form a first area and a second area in the transparent display, wherein the transparent display comprises a touch panel configured to receive a user touch; and
based on the identification providing different functions to the first area and the second area, respectively,
based on at least one control menu being displayed only on the first area, activating a partial area of the touch panel corresponding to the first area and inactivating a remaining area of the touch panel corresponding to the second area on which a first content is displayed, based on a user manipulation, displaying a second content, symmetrical to the first content, on at least one of the first area and the second area, providing another function to a third area in the display which does not overlap with the transparent display, based on an outside object being recognized through the second area in the transparent display, displaying additional information regarding the outside object on the first area and displaying at least one control menu on the third area, based on the outside object being recognized as a sign, displaying a map of a region corresponding to the sign on the first area as the additional information, and based on the outside object including a text, displaying a translation of the text on the first area as the additional information, and wherein the additional information comprises at least one of a map, text translation, an address of a related website, a related image, and a commercial content, and wherein the first area is an area in the transparent display, which overlaps with the first body, and the second area is an area which is a remaining part of the transparent display.

11. The method of claim 10, wherein the display is one of a light-emitting display, a reflective display and a transparent display.

* * * * *